(12) United States Patent
Teba et al.

(10) Patent No.: US 10,741,966 B2
(45) Date of Patent: Aug. 11, 2020

(54) ELECTRONIC CONNECTION ASSEMBLY, AUTOMOTIVE LIGHTING DEVICE AND METHOD FOR MANUFACTURING AN AUTOMOTIVE LIGHTING DEVICE

(71) Applicant: VALEO ILUMINACION, Martos (ES)

(72) Inventors: Daniel Teba, Martos (ES); Juan-Antonio Rubia, Martos (ES); Beatriz Rama, Martos (ES); Antonio Contreras, Martos (ES); Alfonso-Manuel Guzman, Martos (ES); Francisco Martinez, Martos (ES); Manuel-Jesus Medina, Martos (ES)

(73) Assignee: VALEO ILUMINACION, Martos (ES)

( * ) Notice: Subject to any disclaimer, the term of this patent is extended or adjusted under 35 U.S.C. 154(b) by 0 days.

(21) Appl. No.: 16/521,638

(22) Filed: Jul. 25, 2019

(65) Prior Publication Data
US 2020/0036132 A1    Jan. 30, 2020

(30) Foreign Application Priority Data

Jul. 30, 2018   (EP) .................................. 18382574

(51) Int. Cl.
*H01R 13/627*   (2006.01)
*F21S 41/19*    (2018.01)
(Continued)

(52) U.S. Cl.
CPC .......... *H01R 13/627* (2013.01); *F21S 41/192* (2018.01); *F21V 23/06* (2013.01);
(Continued)

(58) Field of Classification Search
CPC .. H01R 12/91; H01R 13/6315; H01R 13/743; H01R 13/627
See application file for complete search history.

(56) References Cited

U.S. PATENT DOCUMENTS 4,909,748 A * 3/1990 Kozono ............. H01R 13/6315
                                              439/247
4,978,313 A * 12/1990 Kameyama ........... H01R 13/74
                                              439/248
(Continued)

FOREIGN PATENT DOCUMENTS

DE      39 23 351 A1    1/1990
EP      0 717 470 A2    6/1996
(Continued)

OTHER PUBLICATIONS

European Search Report dated Dec. 17, 2018 in European Application 18382574.4 filed on Jul. 30, 2018.

*Primary Examiner* — Ross N Gushi
(74) *Attorney, Agent, or Firm* — Oblon, McClelland, Maier & Neustadt, L.L.P.

(57) ABSTRACT

An electronic connection assembly comprises a base, a first connector assembly and a module connector. The base comprises a first opening and a second opening, the second opening comprising a slotted edge with a passage which connects the first opening and the second opening. The first connector assembly comprises a wire harness, a rim and a receiving connector which protrudes a connector height from the rim, the rim being adapted to be introduced into the slotted edge. The module connector is adapted to match with the receiving connector. Either the first connector assembly or the module connector comprises a funnelled guide.

20 Claims, 4 Drawing Sheets

(51) Int. Cl.
  *F21V 23/06* (2006.01)
  *H01R 12/70* (2011.01)
  *H01R 13/631* (2006.01)
  *H01R 13/74* (2006.01)

(52) U.S. Cl.
  CPC ....... *H01R 12/7005* (2013.01); *H01R 13/631* (2013.01); *H01R 13/743* (2013.01); *H01R 2201/26* (2013.01)

(56) References Cited

U.S. PATENT DOCUMENTS

| | | | | |
|---|---|---|---|---|
| 5,002,497 | A * | 3/1991 | Plocek | H01R 13/6315 439/247 |
| 5,197,896 | A * | 3/1993 | Landis | H01R 13/6315 439/247 |
| 5,211,585 | A * | 5/1993 | Douty | H01R 13/64 439/248 |
| 5,407,363 | A * | 4/1995 | Polgar | H01R 13/74 439/546 |
| 5,514,000 | A * | 5/1996 | Krause | H01R 13/6315 439/248 |
| 5,575,673 | A * | 11/1996 | Dahlem | H01R 13/6315 439/248 |
| 5,605,150 | A * | 2/1997 | Radons | A61N 1/39 128/897 |
| 5,620,329 | A * | 4/1997 | Kidd | H01R 13/6315 439/248 |
| 5,697,805 | A * | 12/1997 | Orstad | H01R 13/6315 439/374 |
| 5,888,093 | A * | 3/1999 | Polgar | H01R 13/74 439/546 |
| 5,893,768 | A * | 4/1999 | Gawron | B60R 16/0207 296/152 |
| 6,017,233 | A * | 1/2000 | Fry | H01R 13/743 439/248 |
| 6,030,242 | A * | 2/2000 | Cunningham | H01R 13/6315 439/247 |
| 6,033,247 | A * | 3/2000 | Gregory, II | H01R 13/6315 439/247 |
| 6,095,854 | A * | 8/2000 | Sommer | H01R 13/743 439/545 |
| 6,146,184 | A * | 11/2000 | Wilson | H01R 12/7005 439/248 |
| 6,159,030 | A * | 12/2000 | Gawron | H01R 13/6315 439/247 |
| 6,174,185 | B1 * | 1/2001 | Cecil, Jr. | H01R 13/743 439/248 |
| 6,176,738 | B1 * | 1/2001 | Consoli | H01R 13/631 439/545 |
| 6,196,856 | B1 * | 3/2001 | De Villeroche | H01R 13/6315 439/248 |
| 6,254,408 | B1 * | 7/2001 | Hattori | H01R 13/62905 439/157 |
| 6,312,285 | B1 * | 11/2001 | Berg | H01R 13/74 439/545 |
| 6,325,652 | B1 * | 12/2001 | Grant | H01R 13/6315 439/248 |
| 6,390,841 | B1 * | 5/2002 | Zaguskin | H01R 13/6315 439/248 |
| 6,435,891 | B1 * | 8/2002 | Beck, Jr. | H01R 13/6315 439/248 |
| 6,439,909 | B1 * | 8/2002 | Polgar | H01R 13/6315 439/247 |
| 6,565,142 | B1 * | 5/2003 | Gibney, Jr. | B60R 13/0243 296/146.5 |
| 6,641,420 | B2 * | 11/2003 | Blanchfield | H01R 13/6315 439/247 |
| 6,659,788 | B2 * | 12/2003 | Canuto | B60R 16/027 439/248 |
| 6,848,925 | B2 * | 2/2005 | Nishide | H01R 13/73 439/157 |
| 6,960,099 | B2 * | 11/2005 | McAlonis | H01R 13/6273 439/545 |
| 7,059,882 | B2 * | 6/2006 | Sugita | H01R 13/6315 439/247 |
| 7,090,521 | B2 * | 8/2006 | Nishio | H01R 13/6315 439/248 |
| 7,168,978 | B1 * | 1/2007 | Trout | H01R 13/743 439/545 |
| 7,182,637 | B2 * | 2/2007 | Coyle, Jr. | H01R 13/743 439/281 |
| 7,390,207 | B2 * | 6/2008 | Noguchi | H01R 13/6315 439/248 |
| 7,393,228 | B2 * | 7/2008 | Kabasawa | H01R 13/631 439/247 |
| 7,462,067 | B1 * | 12/2008 | Whiteman, Jr. | H01R 13/743 439/562 |
| 7,553,188 | B2 * | 6/2009 | Whiteman, Jr. | H01R 13/743 439/552 |
| 7,597,587 | B1 * | 10/2009 | Duesterhoeft | H01R 13/629 439/545 |
| 7,789,701 | B2 * | 9/2010 | Murr | H01R 13/743 439/552 |
| 7,841,886 | B2 * | 11/2010 | Klein | H01R 13/506 439/352 |
| 8,210,861 | B2 * | 7/2012 | Tanis | H01R 13/6315 439/248 |
| 8,353,720 | B2 * | 1/2013 | Sun | H01R 13/748 439/545 |
| 8,932,071 | B2 * | 1/2015 | Venema | H01R 13/62 439/248 |
| 9,281,615 | B1 | 3/2016 | Plaza et al. | |
| 9,820,537 | B2 * | 11/2017 | Sachee | A44B 18/0046 |
| 9,917,403 | B2 * | 3/2018 | Doi | H01R 13/6315 |
| 10,003,146 | B2 * | 6/2018 | Doi | H01R 12/707 |
| 2001/0053623 | A1 * | 12/2001 | Fukamachi | H01R 13/62933 439/247 |
| 2002/0013079 | A1 * | 1/2002 | Yoshimatsu | H01R 12/714 439/247 |
| 2002/0119709 | A1 * | 8/2002 | Mochizuki | H01R 13/6295 439/701 |
| 2004/0058574 | A1 * | 3/2004 | Nishide | B60R 16/02 439/155 |
| 2004/0077197 | A1 * | 4/2004 | Nishide | H01R 13/62972 439/157 |
| 2005/0003689 | A1 * | 1/2005 | Nishide | H01R 13/62966 439/157 |
| 2006/0240696 | A1 * | 10/2006 | Ide | H01R 13/506 439/248 |
| 2006/0281352 | A1 * | 12/2006 | Kabasawa | H01R 13/631 439/247 |
| 2008/0293277 | A1 * | 11/2008 | Kumar | H01R 13/53 439/247 |
| 2011/0065300 | A1 * | 3/2011 | Kobayashi | H01R 13/6315 439/248 |
| 2014/0273648 | A1 * | 9/2014 | Baumler | H01R 31/06 439/638 |
| 2019/0027865 | A1 * | 1/2019 | Sakaue | H01R 13/20 |
| 2020/0036132 | A1 * | 1/2020 | Teba | F21S 41/192 |

FOREIGN PATENT DOCUMENTS

| | | |
|---|---|---|
| FR | 2 969 109 A1 | 6/2012 |
| JP | 5-53013 U | 7/1993 |
| JP | 5-254472 | 10/1993 |

* cited by examiner

ELECTRONIC CONNECTION ASSEMBLY, AUTOMOTIVE LIGHTING DEVICE AND METHOD FOR MANUFACTURING AN AUTOMOTIVE LIGHTING DEVICE

TECHNICAL FIELD

This invention is related to the field of the manufacturing of automotive lighting devices, and more specifically to the positioning of lighting modules on a lighting device housing.

STATE OF THE ART

Vehicles lighting devices require an increasing number of electric connections to perform new functions, providing a safer and advanced performance.

A harness of wires is used to make information and electric supply reach each one of the light sources of the lighting device. This harness is distributed in different bundles throughout the housing, because lighting modules must be located in specific positions to fulfil strict regulations.

Each one of these wires bundles ends with an electrical connector, which is electrically coupled to the lighting module. However, these wires bundles are loose and, since the assembly of the lighting devices is made manually, with reduced visibility and accessibility, the final layout of these bundles after connecting the lighting module is uncertain. This may be dangerous and impact the correct operation of the lighting device.

Further, current lighting modules sometimes request freedom to rotate or pivot at the user's request, so these connections cannot be excessively tight.

DESCRIPTION OF THE INVENTION

The invention provides a solution for this problem by means of an electronic connection assembly according to claim 1, an automotive lighting device according to claim 11 and a manufacturing method according to claim 12. Preferred embodiments of the invention are defined in dependent claims.

Unless otherwise defined, all terms (including technical and scientific terms) used herein are to be interpreted as is customary in the art. It will be further understood that terms in common usage should also be interpreted as is customary in the relevant art and not in an idealised or overly formal sense unless expressly so defined herein.

In this text, the term "comprises" and its derivations (such as "comprising", etc.) should not be understood in an excluding sense, that is, these terms should not be interpreted as excluding the possibility that what is described and defined may include further elements, steps, etc.

In a first inventive aspect, the invention provides an electronic connection assembly comprising
- a base with a first opening and a second opening, the second opening comprising a slotted edge with a passage which connects the first opening and the second opening;
- a first connector assembly comprising a wire harness, a rim and a receiving connector which protrudes a connector height from the rim, the rim being adapted to be introduced into the slotted edge;
- a module connector adapted to match with the receiving connector;

wherein either the first connector assembly or the module connector comprises a funnelled guide.

This assembly allows a semiautomatic electrical connection between the module connector and the receiving connector, which is previously arranged in the slotted edge. The module connector is safely connected in a single movement where mechanical and electric connections are achieved at the same time.

This funnel shaped guide helps one connector reach the second connector even if they are misaligned.

In some particular embodiments, the slotted edge comprises at least one tab adapted to cooperate in the insertion of the rim in the slotted edge.

This tab is useful since the insertion of a rim in a slotted edge is not always easy.

In some particular embodiments, the second opening comprises a first positioning element and the rim of the first connector assembly comprises a second positioning element adapted to cooperate with the first positioning element, so that the rim may only enter the slotted edge in a correct position.

Sometimes it is useful to provide means for ensuring the correct orientation of the receiving connector, since some module connectors are not reversible and only accept one correct position.

In some particular embodiments, the first positioning element is a hole in one tab or a hollow portion between two tabs and the second positioning element is a protrusion in the rim.

A protrusion in the rim is a cheap and reliable way of ensuring the correct position of the receiving connector.

In some particular embodiments, the receiving connector and the module connector comprise fitting interrelated elements. These fitting interrelated means are useful to prevent that the connectors may accidentally disengage. Some examples of these fitting interrelated means are a snap-fit connection or a pressure-fit connection.

In some particular embodiments, the funnelled guide is rectangular. This shape is particularly advantageous, since it provides some corners which help the module connector to quickly align.

In some particular embodiments, the rim is connected to the rest of the first connector assembly by means of at least one U-shaped element, which absorbs displacement and collaborates in the insertion of the rim in the slotted edge.

These U-shaped elements are useful to provide the rim with flexibility so that it may be more easily introduced in the slotted edge.

In some particular embodiments, the funnelled guide extends to completely surround the whole connector height and exceeds the connector height in at least 2 mm.

This funnelled guide provides a good protection for the connector and receives the corresponding matching connector in a suitable misalignment range.

In a further inventive aspect, the invention provides an automotive lighting device comprising an electronic connection assembly according to the previous inventive aspect.

In a further inventive aspect, the invention provides a method for manufacturing an automotive lighting device, the method comprising the steps of
- providing the electronic connection assembly according to the preceding inventive aspect, wherein the base is comprised in a lighting device housing;
- passing the receiving connector through the first opening and passing the wire harness through the passage so that the receiving connector and a portion of the wire harness is at one side of the second opening and a second portion of the wire harness is at the other side of the second opening inserting the rim of the receiving connector in the slotted edge of the second opening wherein the slotted edge provides a play so that the rim is free to move in at least one direction inside the slotted edge;

approaching an electronic module comprising the module connector to the receiving connector, wherein either the receiving connector or the module connector comprises a funnelled guide, so that, in the event the module connector is not perfectly aligned with the receiving connector, the reaction force between one of the connectors and the funnelled guide makes the receiving connector move within the slotted edge and align with the module connector so that a mechanical and electric connection may take place between the receiving connector and the module connector.

When such a method is used, mechanic and electric connection is achieved in the same step, which may be performed automatically, even if the module connector and the receiving connector are misaligned.

BRIEF DESCRIPTION OF THE DRAWINGS

To complete the description and in order to provide for a better understanding of the invention, a set of drawings is provided. Said drawings form an integral part of the description and illustrate an embodiment of the invention, which should not be interpreted as restricting the scope of the invention, but just as an example of how the invention can be carried out. The drawings comprise the following figures.

DETAILED DESCRIPTION OF THE INVENTION

Figure 1:
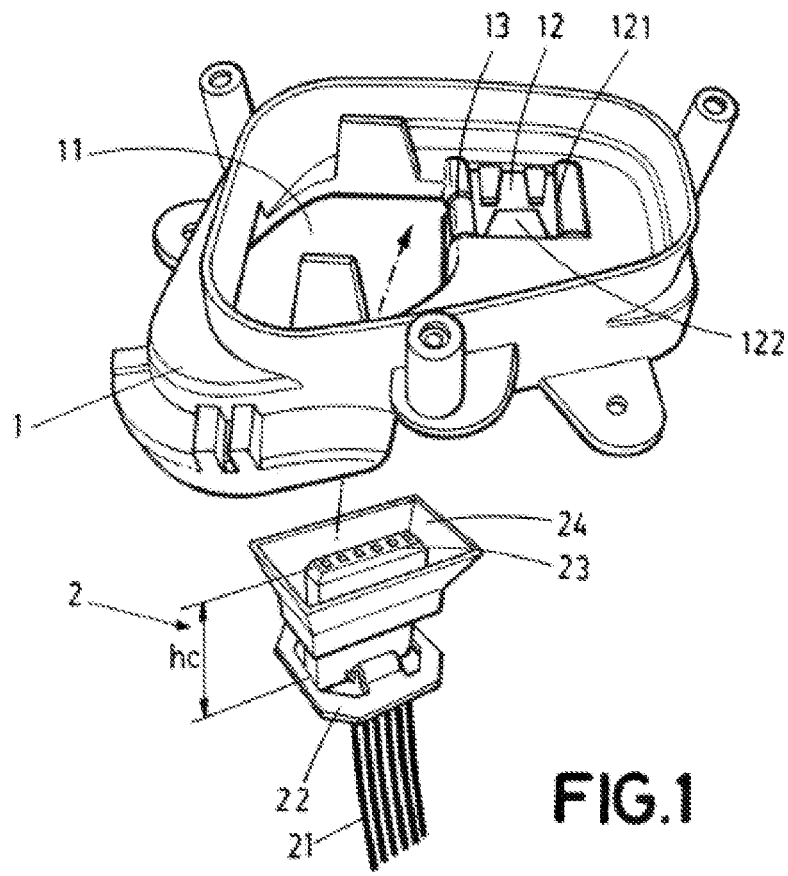
FIG. 1 shows a first step of a method according to the invention.

The example embodiments are described in sufficient detail to enable those of ordinary skill in the art to embody and implement the systems and processes herein described. It is important to understand that embodiments can be provided in many alternate forms and should not be construed as limited to the examples set forth herein.

Accordingly, while embodiment can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included. Elements of the example embodiments are consistently denoted by the same reference numerals throughout the drawings and detailed description where appropriate.

FIG. 1 shows a first step of a method according to the invention. In this step, a connection assembly is provided.

This connection assembly comprises a housing 1 of an automotive lighting device, this housing 1 comprising a first opening 11 and a second opening 12. The second opening 12 comprises a slotted edge 121 and there is a passage 13 which connects the first opening 11 and the second opening 12.

Further, this connection assembly comprises a first connector assembly 2. This first connector assembly 2 comprises a wire harness 21, a rim 22 and a receiving connector 23.

The rim 22 has a shape which is adapted to be introduced into the slotted edge 121 of the second opening 12 of the housing 1.

The receiving connector 23 protrudes a connector height hc from the rim 22, so that it may be easily reached by a corresponding connector. Further, the first connector assembly 2 further comprises a funnelled guide 24, which is configured to guide this corresponding connector when it approaches the receiving connector 23.

Figure 2:
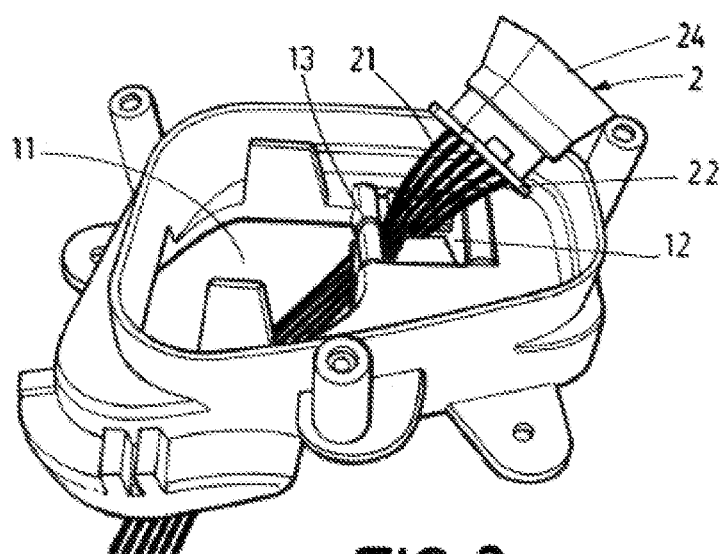
FIG. 2 shows a second step of a method according to the invention.

FIG. 2 shows a second step of this method. In this step, the first connector assembly 2 is passed through the first opening 11 and the wire harness 21 is passed through the passage 13. With these two sub-steps, the first connector assembly 2 is at both sides of the second opening 12: a portion of the wire harness is located at a first side of the second opening 12 and the rest of the wire harness, together with the rim 22, the receiving connector (not seen) and the funnelled guide 24, is located at the second side of the second opening 12.

Figure 3:
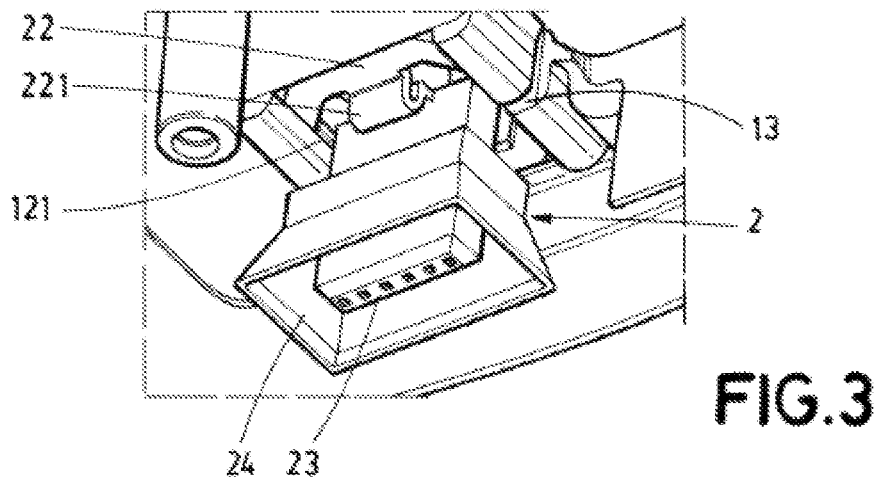
FIG. 3 shows a third step of a method according to the invention.

FIG. 3 shows a third step of this method. The rim 22 of the first connector assembly 2 is inserted in the slotted edge 121 of the second opening. The slotted edge 121 provides a play: the slot has greater dimensions than the rim 22, so that the rim 22 is free to move in at least one direction inside the slotted edge 121. The insertion of the rim 22 is made easier by some U-shaped elements 221 which connect the rim 22 with the rest of the first connector assembly 2. These U-shaped elements 221 absorb the deformation of the rim 22 so that it is easily introduced into the slotted edge 121.

In this step of introducing the rim 22 into the slotted edge 121, sometimes it is required that this rim is introduced in a particular correct orientation. As a consequence, some means for ensuring this correct insertion are provided.

Figure 4:
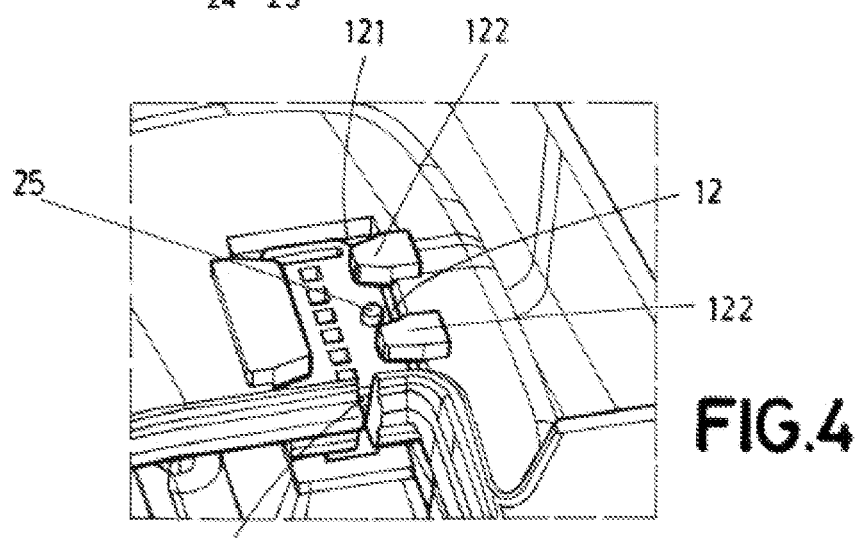
FIG. 4 shows a particular view of a detail of an assembly according to the invention.

As shown in FIG. 4, the slotted edge 121 comprises two tabs 122. These tabs 122 are configured to cooperate with one protrusion 25 located in the rim, thus creating a poka-yoke system to avoid an incorrect orientation of the rim 22 in the slotted edge 121.

Figure 5:
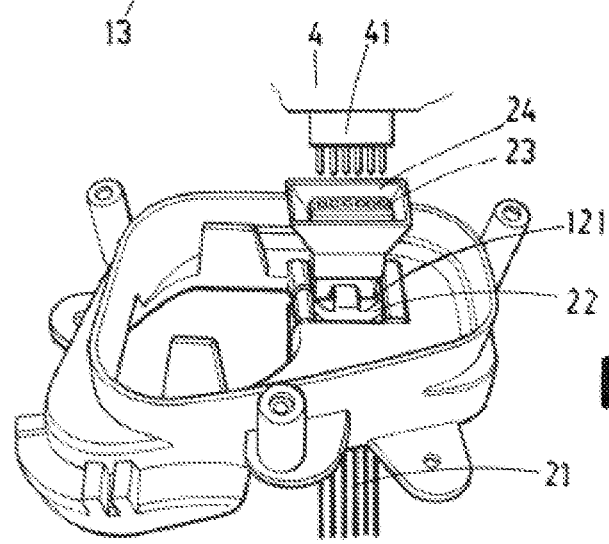
FIG. 5 shows a fourth step of a method according to the invention.

FIG. 5 shows a fourth step of this method. In this step, an electronic module 4 comprising the module connector 41 approaches to the receiving connector 23. Since the receiving connector 23 comprises a funnelled guide 24, in the event the module connector 41 is not perfectly aligned with the receiving connector 23, the reaction force between the module connector 41 and the funnelled guide 24 makes the receiving connector 23 move within the slotted edge 121 and align with the module connector so that a mechanical and electric connection may take place between the receiving connector and the module connector.

Once both connectors are together, there are some fitting interrelated elements in both connectors, so that, by a simple and automated approaching step, both connectors may be easily both mechanically and electrically connected.

In the embodiment of this figure, these fitting interrelated elements comprise a pressure-fit connection, so that when both connectors are near enough, the tight dimensions difference between them makes that both remain together after the pressure is removed. In other embodiments, a snap-fit connection is used for this purpose.

Figure 6A:
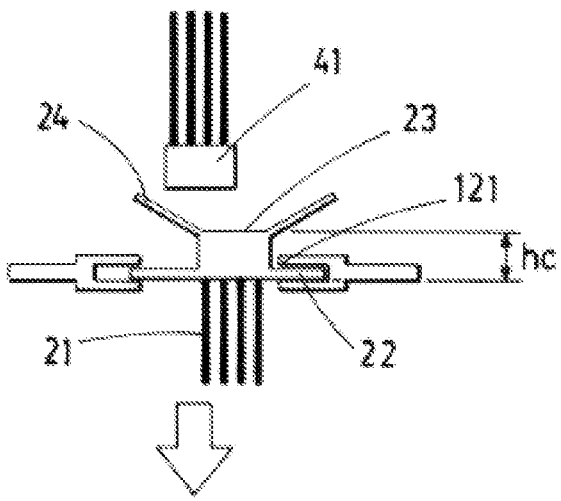
FIGS. 6A, 6B, and 6C show a schematic description of the operation principle of a method according to the invention.
Figure 6B:
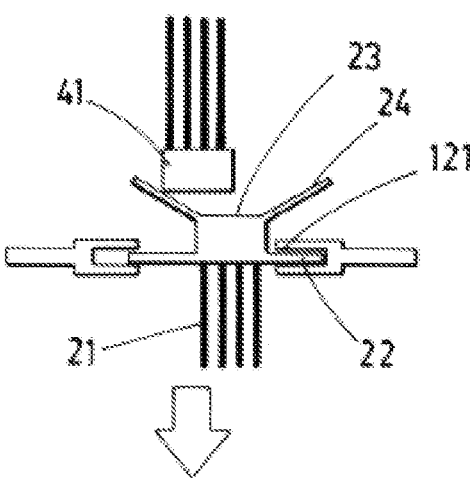
Figure 6C:
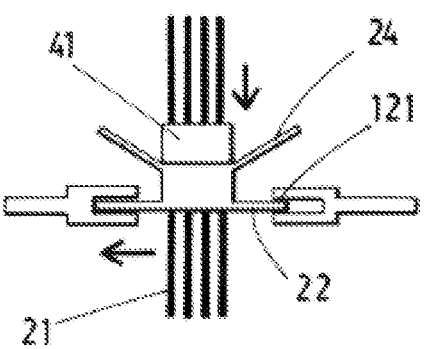

FIGS. 6A, 6B, and 6C show a schematic example of the approaching step when both connectors are misaligned.

As it has been shown in the previous figure, the module connector 41 approaches the receiving connector 23 (FIG. 6A). As the funnelled guide 24 is rectangular, it provides a good guidance for the module connector 41, providing a reaction force in the event the module connector 41 is not perfectly aligned with the receiving connector 23 (FIG. 6B). Further, since the funnelled guide 24 extends to completely surround the whole connector height hc and exceeds the connector height in at least 2 mm, the module connector 41 has enough surface to vary the position of the first connector assembly 2. Finally, the receiving connector 23 moves and the connection between the module connector 41 and the receiving connector 23 finally takes place (FIG. 6C).

Figure 7:
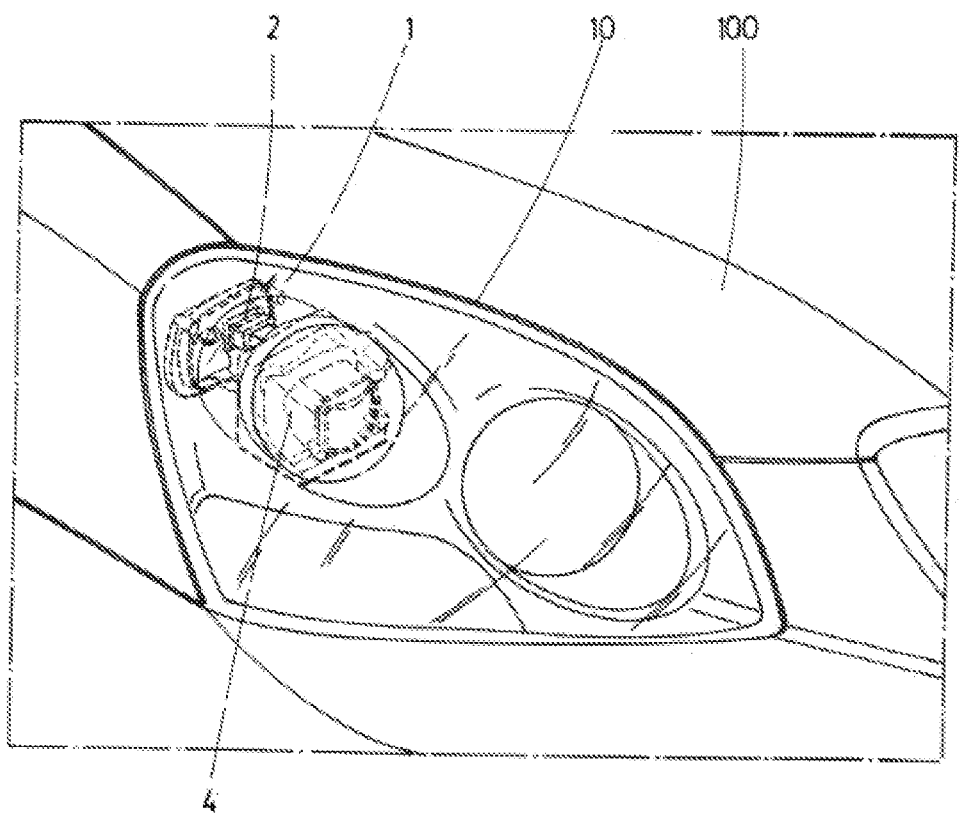
FIG. 7 shows an automotive vehicle with an automotive lighting device according to the invention.

FIG. 7 shows an automotive vehicle 100 comprising an automotive lighting device 10 with an electronic connection assembly as described in the previous figures. This automotive lighting device 10 may be more easily and reliably manufactured, thus saving cost and time.

The invention claimed is:

1. Electronic connection assembly comprises;
   a base with a first opening and a second opening, the second opening comprising a slotted edge with a passage which connects the first opening and the second opening;
   a first connector assembly comprising a wire harness, a rim and a receiving connector which protrudes a connector height from the rim, the rim being adapted to be introduced into the slotted edge;
   a module connector adapted to match with the receiving connector;
   wherein either the first connector assembly or the module connector comprises a funnelled guide.

2. Electronic connection assembly according to claim 1, wherein the slotted edge comprises at least one tab adapted to cooperate in an insertion of the rim in the slotted edge.

3. Electronic connection assembly according to claim 2, wherein the second opening comprises a first positioning element and the rim of the first connector assembly comprises a second positioning element adapted to cooperate with the first positioning element, so that the rim may only enter the slotted edge in a correct position.

4. Electronic connection assembly according to claim 2, wherein the receiving connector and the module connector comprise fitting interrelated elements.

5. Electronic connection assembly according to claim 2, wherein the funnelled guide is rectangular.

6. Electronic connection assembly according to claim 2, wherein the rim is connected to the rest of the first connector assembly by means of at least one U-shaped element, which absorbs displacement and collaborates in the insertion of the rim in the slotted edge.

7. Electronic connection assembly according to claim 2, wherein the funnelled guide extends to completely surround the whole connector height and exceeds the connector height in at least 2 mm.

8. Automotive lighting device comprises an electronic connection assembly according to claim 2.

9. Method for manufacturing an automotive lighting device, the method comprises the steps of
   providing the electronic connection assembly according to claim 2, wherein the base is comprised in a lighting device housing;
   passing the receiving connector through the first opening and passing the wire harness through the passage so that the receiving connector and a portion of the wire harness is at one side of the second opening and a second portion of the wire harness is at the other side of the second opening;
   inserting the rim of the receiving connector in the slotted edge of the second opening, wherein the slotted edge provides a play so that the rim is free to move in at least one direction inside the slotted edge;
   approaching an electronic module comprising the module connector to the receiving connector, wherein either the receiving connector or the module connector comprises the funnelled guide, so that, in the event the module connector is not perfectly aligned with the receiving connector, a reaction force between one of the connectors and the funnelled guide makes the receiving connector move within the slotted edge and align with the module connector so that a mechanical and electric connection may take place between the receiving connector and the module connector.

10. Electronic connection assembly according to claim 1, wherein the second opening comprises a first positioning element and the rim of the first connector assembly comprises a second positioning element adapted to cooperate with the first positioning element, so that the rim may only enter the slotted edge in a correct position.

11. Electronic connection assembly according to claim 10, wherein the first positioning element is a hole in one tab or a hollow portion between two tabs and the second positioning element is a protrusion in the rim.

12. Electronic connection assembly according to claim 1, wherein the receiving connector and the module connector comprise fitting interrelated elements.

13. Electronic connection assembly according to claim 12, wherein the second opening comprises a first positioning element and the rim of the first connector assembly comprises a second positioning element adapted to cooperate with the first positioning element, so that the rim may only enter the slotted edge in a correct position.

14. Electronic connection assembly according to claim 13, wherein the fitting interrelated elements comprise a snap-fit connection.

15. Electronic connection assembly according to claim 13, wherein the fitting interrelated elements comprise a pressure-fit connection.

16. Electronic connection assembly according to claim 1, wherein the funnelled guide is rectangular.

17. Electronic connection assembly according to claim 1, wherein the rim is connected to the rest of the first connector assembly by means of at least one U-shaped element, which absorbs displacement and collaborates in an insertion of the rim in the slotted edge.

18. Electronic connection assembly according to claim 1, wherein the funnelled guide extends to completely surround the whole connector height and exceeds the connector height in at least 2 mm.

19. Automotive lighting device comprises an electronic connection assembly according to claim 1.

20. Method for manufacturing an automotive lighting device, the method comprising the steps of
   providing the electronic connection assembly according to claim 1, wherein the base is comprised in a lighting device housing;
   passing the receiving connector through the first opening and passing the wire harness through the passage so that the receiving connector and a portion of the wire harness is at one side of the second opening and a second portion of the wire harness is at the other side of the second opening;

inserting the rim of the receiving connector in the slotted edge of the second opening wherein the slotted edge provides a play so that the rim is free to move in at least one direction inside the slotted edge;

approaching an electronic module comprising the module connector to the receiving connector, wherein either the receiving connector or the module connector comprises the funnelled guide, so that, in the event the module connector is not perfectly aligned with the receiving connector, a reaction force between one of the connectors and the funnelled guide makes the receiving connector move within the slotted edge and align with the module connector so that a mechanical and electric connection may take place between the receiving connector and the module connector.

* * * * *